United States Patent [19]
Mc Gahee

[11] 3,855,723
[45] Dec. 24, 1974

[54] FISHING APPARATUS AND QUICK CONNECTORS THEREFOR

[75] Inventor: Melbourne D. Mc Gahee, Melbourne, Fla.

[73] Assignee: Loop A Line, Inc., Melbourne, Fla.

[22] Filed: Dec. 26, 1973

[21] Appl. No.: 428,479

[52] U.S. Cl. ...... 43/44.83, 24/201 HE, 24/230.5 W
[51] Int. Cl. ............................................. A01k 91/04
[58] Field of Search ............ 43/44.83; 24/201 HE, 24/230.5 R, 230.5 W

[56] References Cited
UNITED STATES PATENTS
1,298,051  3/1919  Keator ..................... 24/230.5 W
1,728,560  9/1929  Goshorn ..................... 43/44.83 X FOREIGN PATENTS OR APPLICATIONS
184,593  8/1922  Great Britain ................... 43/44.83

Primary Examiner—Louis G. Mancene
Assistant Examiner—Daniel J. Leach
Attorney, Agent, or Firm—Warren E. Ray

[57] ABSTRACT

Fishing apparatus having an elongated eye member for cooperation with a special rapid connect-disconnect connector device having a left and right member fixed to a horizontal oval eye member, one of the members continuing beyond the horizontal eye member as one leg of a vertical loop which has a bend and a second vertical leg that passes centrally back through the horizontal eye member a substantial distance. The elongated eye member and the connector may be reversed with respect to diverse fishing implements. The special connector may be combined with a fishing float, lure, sinker, or spoon, and with a second different connector. A modified hook and a modified leader are provided with an elongated eye for cooperation with the special connector device.

18 Claims, 9 Drawing Figures

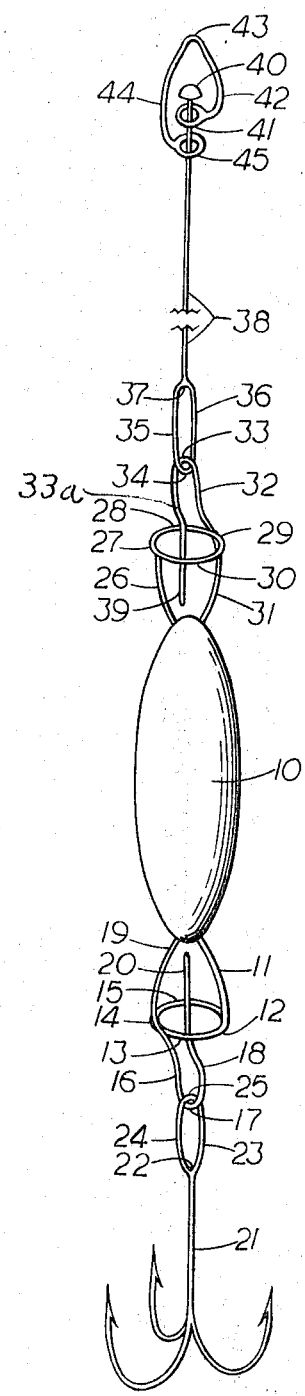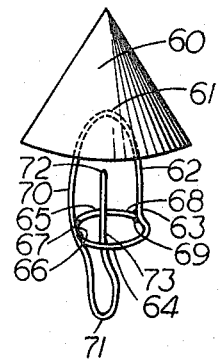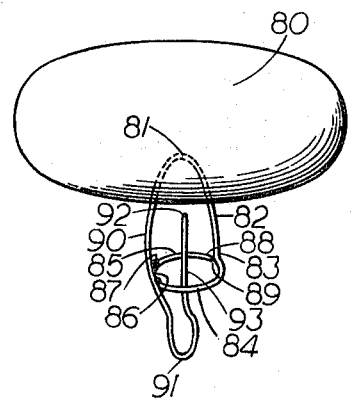
FIG. 7
FIG. 8
FIG. 9

FISHING APPARATUS AND QUICK CONNECTORS THEREFOR

This invention relates to fishing equipment, and more particularly to a connector combined with fishing apparatus for a rapid connect-disconnect operation representing an improvement on my U.S. Pat. No. 3,754,347 granted on Aug. 28, 1973.

BRIEF SUMMARY OF THE INVENTION

The special connector is provided in combination with diverse fishing implements for the rapid exchanging of implements such as fishhooks, floats, leaders, spoons and lures with a minimum of effort. While a loop in a flexible fishing line may be utilized with some of the devices illustrated, an implement with an elongated eye is disclosed that cooperates with the special connector having an oval horizontal eye with a central shaft passing therethrough.

The primary object of the invention is the provision of a special connector combined with fishing apparatus whereby such apparatus may be exchanged quickly without the necessity of tieing or untieing of knots in the fishing line.

Another object is the provision of a different connector, somewhat similar to the connector shown in my U.S. Pat. No. 3,754,347 mentioned above, combined with the special connector.

Still another object is the provision of fishing apparatus with an elongated eye for cooperation with the special connector.

Further objects and advantages of my invention will be apparent from the following detailed description taken in conjunction with the accompanying drawings in which:

BRIEF DESCRIPTION OF THE SEVERAL VIEWS OF THE DRAWINGS

FIG. 7 depicts a fishing spoon with the special connector on each end cooperating with a treble fishhook with elongated eye and with a stiff leader having an elongated eye at one end and a different connector at the other end;

FIG. 8 illustrates the special connector combined with a fishing weight or sinker; and FIG. 9 shows the special connector combined with a fishing float.

DETAILED DESCRIPTION

Except for slight modification in some of the figures the special connector is the same, viz., the horizontal oval eye has two side supporting members one of which is extended above the oval eye with a bend and integral shaft that passes back through the oval eye a substantial distance as will be described hereinafter with reference to the figures.

Figure 1:
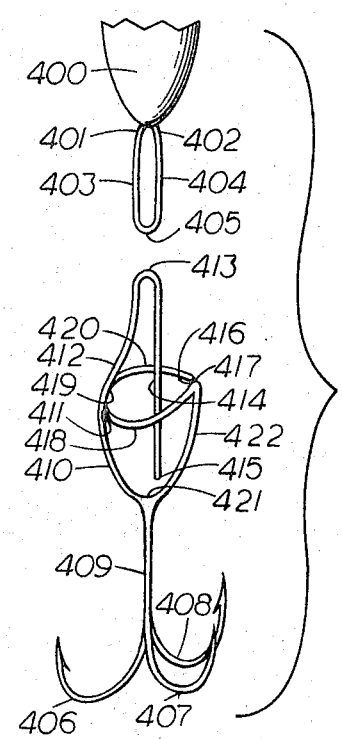
FIG. 1 shows the special connector combined with a treble fishhook with a fishing spoon or lure having an elongated eye member.

In FIG. 1, 400 is a fishing spoon or lure having an elongated eye member with a left member 403 and leg 401 connected to the lure 400, a right member 404 with leg 402 connected to the lure 400, and a bend 405 between members 403, 404. The elongated eye member has sufficient length so that with the flat side of the eye member along a long side of the oval horizontal eye member it may be inserted between the central shaft and the oval eye and over the end of the central shaft. A pull will place the elongated eye member in the position shown in FIG. 4. The numerals 406, 407, 408 indicate the hooks of a treble fishhook having a shank 409 integral with the special connector. A lower bend 421 is integral with a left upstanding portion 410 and a right upstanding portion 422 below the oval horizontal eye member in FIG. 1. The oval horizontal eye member includes a right portion 416, a front portion 418, a left portion 419, and a back portion 420. The left upstanding portion 410 continues upward into a left upstanding portion 412 above the oval horizontal eye member (downward in some figures) to an upper bend 413. A central shaft 414 from the upper bend 413 descends downward centrally through the oval horizontal eye member to an end 415. It will be noted that the length of the central shaft 414 and the length of the elongated eye on the lure 400 must be such that the elongated eye can be mated with the central shaft as hereinbefore described. If the special connector is not cast integrally a brazing material is applied at 411 to join the horizontal eye left portion 419 with the left upstanding portion 410. The numeral 417 indicates a joint between right upstanding portion 422 and the right portion 416 of the oval horizontal eye member. After the elongated eye of the lure is inserted through the oval horizontal eye and over the end 415 of the central shaft the apparatus would be as shown in FIG. 4.

Figure 2:
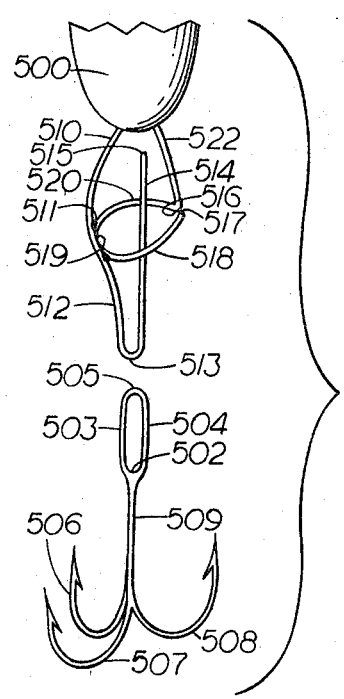
FIG. 2 is similar to FIG. 1 with the special connector connected to a fishing spoon or lure cooperating with a treble fishhook provided with an elongated eye.

A reversal of elements is depicted in FIG. 2 wherein the special connector is combined with the fishing lure or spoon and the elongated eye is provided on the fishhook. In this figure the lure 500 carries the special connector that cooperates with a fishhook having treble hooks 506, 507, 508 and a shank 509. This hook is provided with an elongated eye having a lower bend 502, a left member 503, a right member 504 with a bend 505 between 503, 504. Integral with the lure or spoon 500 the special connector includes a left upstanding portion 510, a right upstanding portion 522 above the horizontal oval eye (in this figure), a continuation of 510 indicated at 512 below the oval horizontal eye, the latter having a bend at 513 connecting with a central shaft 514 extending centrally and through the oval eye having an end 515. The oval horizontal eye member has a right portion 516 with a joint 517 with right upstanding portion 522, a front portion 518, a left portion 519, and a back portion 520. The braze material 511 connects the left oval horizontal eye portion 519 with 510 and 512 when the special connector is not produced integrally. As in FIG. 1 the parts cooperate by passing the flat side of the fishhook elongated eye through the oval horizontal eye, flat side along the long side of the oval eye, over the end 515 of the central shaft 514, and pulling on the hook so as to cause it to end up in the position similar to FIG. 4.

Figure 3:
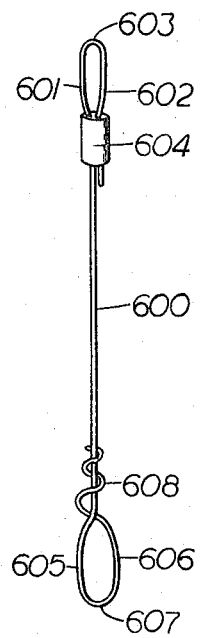
FIG. 3 discloses a stiff double-ended leader modified to provide elongated eyes or loops for use with the special connector of this invention.

In FIG. 3 a stiff wire leader 600 is modified so as to provide elongated eyes as required to cooperate with the special connector disclosed herein. The upper elongated eye has a left member 601, a right member 602 with an upper bend 603 between the two members. The left and right members of the elongated eye member are held with a conventional metal crimping device 604. The lower elongated eye member includes a left member 605, a right member 606, and a bend 607 between the two members. A knot or a wrapping is indicated at 608 as exemplary of the prior art. It will be understood that the elongated eyes of the stiff leader are necessary for utilization with the special connector disclosed herein.

Figure 4:
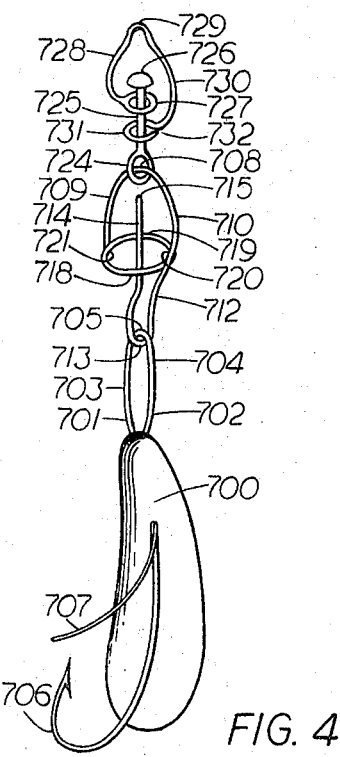
FIG. 4 depicts the special connector cooperating with a different connector and with a fishing spoon having an elongated eye.

Turning now to FIG. 4, the fishing spoon 700 with hook 706 and anti-weed device 707 is provided with an elongated eye having left eye member 703 with lower portion 701 connected to the fishing spoon, a right eye member 704 with lower portion 702 also connected to the spoon, and a bend 705 between the left and right eye members. The spoon or lure eye is elongated so as to cooperate with the special connector as hereinbefore set forth. The special connector comprises an upper bend 708, left upstanding member 709 and right upstanding member 710 integral with bend 708, the right upstanding member 710 continuing downward in right upstanding member 712 below the oval horizontal eye to a vertical bend 713. A central shaft is connected to the bend 713 and descends centrally of the oval horizontal eye to an end 715. The elongated eye of the fishing spoon is inserted through the oval horizontal eye, flat side along a long side of the oval eye, and over the end 715 of central shaft 714. A pull on the spoon places it in the position shown in this figure. The oval horizontal eye member includes a front portion 718 and a back portion 719 which are longer than right side portion 720 and left side portion 721. The left and right upstanding members 709, 710 and the right upstanding member 712 are integral with the oval horizontal side members 720, 721. The eye 724 on central shank 725 of a second connector encircles the bend 708 of the special connector. A spherical or other type head 726 on the central shank 725 retains with swivel action a device having an upper eye member 727 and a lower eye member 731 encircling the shank 725, there being a small gap at 732 (or filled with a brazing material as shown in FIGS. 1–2 if desired), and further including a left side connector loop 728 connected to the upper eye, a right side connector loop 730, and a crimped portion 729 joined with the loops providing a place for the loop of a fishing line. The loop of the fishing line is attached by passing the loop through the eye 727 from below, up over the head 726, and back through the eye 727 from top to bottom whereby a pull on the line will place it in the crimp 729 (see U.S. Pat. No. 3,754,347 where the process is illustrated). It will be noted that the second connector provides apparatus whereby a fishing line with loop may be readily attached or removed with swivel action and up-down movement in combination with the special connector permitting rapid exchange of fishing implements.

Figure 5:
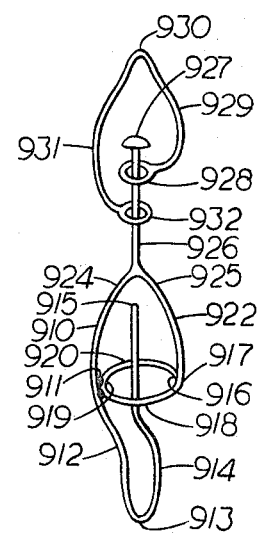
FIG. 5 illustrates a modified special connector cooperating with a different connector.

The special connector with slight modification is shown with a second connector in FIG. 5. In this figure 910 is the left upstanding member above the oval horizontal eye, and 922 is the right upstanding member, these being joined with left and right horizontal members 924 and 925. Extending from and integral with 910 is a left upstanding member 912 below the oval horizontal eye, progressing to a bend 913 with central shaft 914 having an end 915 centrally positioned through and above the oval horizontal eye. The oval horizontal eye includes front and back portions 918, 920 which are longer than the side portions 916 on the right and 919 on the left. When the special connector is not manufactured as an integral device a brazing material 911 may be used to join the oval eye to side members 910 and 912. It will be understood that the joinder of parts may be by soldering, welding, or by other known process. The parts 916, 922 are joined at 917 either at initial casting or later by any known method. The second connector is substantially the same as shown in FIG. 4 wherein 926 is a central shank joined to left and right horizontal members of the special connector, and extending upward to a head 927, shown as spherical but which may be semi-spherical or other known configuration. An upper eye 928 and a lower eye 932 encircle the shank 926 and are retained thereon by the head 927. A right side connector loop 929 is joined with the eye 928, and a left side connector loop 931 is joined to the lower eye 932 with the loops being joined at bend or crimp 930. As an example the fishing implements with an elongated eye may be used with the special connector as hereinbefore described, and the loop of a fishing line may be attached to the second connector as described with respect to FIG. 4.

Figure 6:
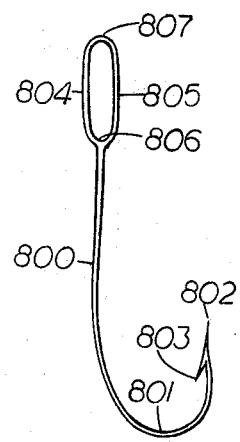
FIG. 6 shows a single fishhook provided with an elongated eye.

FIG. 6 illustrates a single fishhook modified to provide an elongated eye for use with the special connector of this invention. The shank 800 is provided with the usual bend 801, a sharp point 802, and a barb 803. The elongated eye integral with the shank 800 includes a left member 804, a right member 805, both connected with a lower bend 806 and an upper bend 807. The elongated eye is necessary for engagement with the special connector as shown in prior figures including the leader depicted in FIG. 3.

A fishing spoon double-ended with the special connector is shown in FIG. 7 with fishing implements having an elongated eye as a fishhook and a stiff leader, the latter being combined with a different connector on the distal end. The lure or spoon 10 is provided with a lower connector having a right upstanding member 11 and a left upstanding member 19 above the oval horizontal eye connected to the spoon and to the oval eye which has short right and left portions 12, 14 with long front portion 13 and a long back portion 15 for cooperation with a flat elongated eye implement. The left upstanding member 19 continues below the horizontal eye member in left upstanding member 16, a bend 17, and back upward with central shank 18 having an end 20 above the oval horizontal eye member. A treble fishhook 21 is provided with an elongated eye for cooperation with the special connector having a lower bend 22, a right side member 23, a left side member 24, and an upper bend 25 connecting the side members. At the upper end of spoon 10 is shown another special connector which is identical with the one shown on the lower end of spoon 10. It will be understood that the terms right, left, up, and down are relative depending upon how the devices are illustrated or how one looks at the figures, but the special connector is the same in all figures. Left upstanding member 26 and right upstanding member 31 are connected to the lure or spoon 10 and to the oval horizontal eye member, the right upstanding member 31 continuing above the oval horizontal eye member in right upstanding member 32 having an upper bend 33 turning downward in central shank 33a with an end 39 which passes through the oval horizontal eye member. As with other figures showing the special connector the oval horizontal eye member includes left and right short sides 27, 29 and long back and front portions 28, 30. A stiff or near inflexible leader 38 is provided with an elongated eye for cooperation with the special connector having a lower bend 34 connected to left side member 35 and right side member 36, the sides having an upper bend 37 joined to the leader 38. The distal end of the leader 38 is provided with a head 40 larger than upper eye 41 and lower eye 45 so as to retain the swivel-action connector on the leader 38. Connected to upper eye 41 is a right loop 42 of the connector and connected to lower eye 45 is a left loop 44 of the connector, these loop members coming together in an upper bend or crimped portion 43 for receiving the loop of a fishing line. Fishing implements with elongated eye members are attached or removed from the lure or spoon 10 as hereinbefore described. The loop of a flexible fishing line is also utilized with the second connector on the end of the leader 38 as previously set forth.

The special connector may be combined with a fishing weight or sinker shown at 60 in FIG. 8 as a pyramidal lead weight for illustration purposes although the sinker per se may be spherical, oval, or other configuration. The connector is provided with a bend 61 shown in dashed lines embedded in the sinker in any known manner, and connected to bend 61 is right upstanding member 62 and left upstanding member 70, both members being connected to the oval horizontal eye member either integrally or by brazing material 67 and 69. The oval horizontal eye member includes long front and back portions 64, 65 with short left and right portions 66, 68. The lower end 63 of the right upstanding member 62 connects to the short right end portion 68 of the oval eye. As in preceding figures the left upstanding member 70 continues beyond the oval eye to bend 71 to include a central shaft 73 with end 72 descending centrally back through the oval eye a substantial distance. Normally a fishing implement as a leader with an elongated eye is required for utilization of the sinker.

In FIG. 9 the sinker is replaced with a fishing float 80 having the special connector bend 81 shown in dashed lines cast with the float or otherwise fastened thereto. Integral with bend 81 are right upstanding member 82 and a left upstanding member 90 both connected to the oval horizontal eye as at brazing material 87 or at end 83 of the right upstanding member 82. As usual the oval horizontal eye member includes long front and back portions 84, 85, the back portion 85 having an end 88 leaving a gap adjacent right upstanding member 82, a short left portion 86, and a short right portion which is the same as 83 or the end of the right upstanding member 82. It will be understood that the gap 89 may be filled with a brazing material as indicated at 69 in FIG. 8. The left upstanding member 90 continues to a bend 91 connected to central shaft 93 with an end 92 returning back through the oval horizontal eye a substantial distance. As with the sinker the float with special connector is best utilized with a fishing implement with an elongated eye as a leader as shown in FIG. 3.

In summary this invention provides a special connector combined with diverse fishing implements as fishhooks, leaders, lures and spoons, floats, and sinkers, and with a second different connector whereby rapid connections and exchanges may be effected as desired.

It will be apparent that the embodiments shown are only exemplary and that various modifications can be made in construction and arrangement within the scope of my invention as defined in the appended claims.

I claim:

1. Fishing apparatus comprising a special connector, said special connector including an oval horizontal eye member having a pair of long sides and a pair of short sides, a pair of upstanding side members joined to said pair of short sides of said oval horizontal eye member and having their ends joined together, an extension of one of said upstanding side members continuing beyond the opposite side of one of said oval eye side members, a bend in said extension, a central shaft connected to said bend having an end and passing back centrally through said oval eye member, and first and second fishing implements connected to said joined ends of said upstanding side members and to said shaft and disposed in said bend.

2. Fishing apparatus as set forth in claim 1 wherein said first fishing implement includes a fishhook connected to said joined ends of said upstanding side members, and said second fishing implement includes an elongated eye member engaged with said central shaft and said bend.

3. Fishing apparatus as set forth in claim 1 wherein said first fishing implement is a fishing lure connected to said joined ends of said upstanding side members, and said second fishing implement is a fishhook having an elongated eye member engaged with said central shaft and said bend.

4. Fishing apparatus as set forth in claim 1 wherein said extension of one of said upstanding side members and said one of said oval eye side members are joined with a brazing material.

5. Fishing apparatus as set forth in claim 1 wherein said first fishing implement is a fishing spoon having an elongated eye engaged with said central shaft and said bend, and wherein said second fishing implement includes a second connector having a central shank, an eye on said central shank connected to said joined ends of said upstanding side members and a head on the other end of said central shank, a pair of eye members encircling said central shank, a left loop member and a right loop member each joined to one of said pair of eye members encircling said central shank, and a crimped member joining said loop members to receive a fishing line loop.

6. Fishing apparatus comprising a special connector, said special connector including an oval horizontal eye member having a pair of long sides and a pair of short sides, a pair of upstanding side members joined to said pair of short sides of said oval horizontal eye member and having their ends joined together, an extension of one of said upstanding side members continuing beyond the opposite side of one of said oval eye side members, a bend in said extension, a central shaft connected to said bend having an end and passing back centrally through said oval eye member, a shank member joined to said pair of upstanding side members, a head on said shank member, a pair of eye members encircling said shank member retained thereon by said head, a left loop member connected to one of said eye members, a right loop member connected to the other of said eye members, a crimped portion joining said loop members, and a fishing implement connected to said special connector.

7. Fishing apparatus according to claim 6 wherein said fishing implement includes a fishhook having an elongated eye member.

8. Fishing apparatus according to claim 6 wherein said fishing implement includes a stiff leader having an elongated eye member.

9. Fishing apparatus according to claim 6 wherein said special connector includes a brazing material joining said extension of one of said upstanding side members to said one short side of said oval horizontal eye member.

10. Fishing apparatus comprising a fishing lure, a special connector at each end of said lure, each special connector including an oval horizontal eye member having a pair of long sides and a pair of short sides, a pair of upstanding side members joined to said pair of short sides of said oval horizontal eye member and to said lure, an extension of one of said upstanding side members continuing beyond the opposite side of one of said oval eye side members, a bend in said extension, a central shaft connected to said bend having an end and passing back centrally through said oval eye member, and first and second fishing implements connected to said upstanding side members and to said shafts and disposed in said bends.

11. Fishing apparatus according to claim 10 wherein said first fishing implement is a fishhook having an elongated eye.

12. Fishing apparatus according to claim 10 wherein said second fishing implement is a stiff leader having an elongated eye.

13. Fishing apparatus according to claim 12 wherein said stiff leader includes a head on the distal end thereof, a pair of eye members retained on said stiff leader by said head, a left loop member connected to one of said eye members, a right loop member connected to the other of said eye members, and a crimped portion connecting said eye members.

14. Fishing apparatus comprising a special connector, said special connector including an oval horizontal eye member having a pair of long sides and a pair of short sides, a pair of upstanding side members joined to said pair of short sides of said oval horizontal eye member, an extension of one of said upstanding side members continuing beyond the opposite side of one of said oval eye side members, a bend in said extension, a central shaft connected to said bend having an end and passing back centrally through said oval eye member, and a fishing implement connected to the distal ends of said pair of upstanding side members.

15. Fishing apparatus according to claim 14 wherein said fishing implement is a fishing sinker.

16. Fishing apparatus according to claim 14 wherein said fishing implement is a fishing float.

17. Fishing apparatus according to claim 14 wherein a small gap is provided between the end of one of said oval horizontal eye member long sides and one of the upstanding side members opposite the said extension.

18. Fishing apparatus according to claim 17 wherein said gap is filled with a brazing material and wherein said extension is joined to one of said oval horizontal eye side members with a brazing material.

* * * * *